US009712323B2

(12) United States Patent
Green et al.

(10) Patent No.: US 9,712,323 B2
(45) Date of Patent: Jul. 18, 2017

(54) DETECTION OF UNAUTHORIZED ENTITIES IN COMMUNICATION SYSTEMS

(71) Applicants: Michael Green, Central Valley, NY (US); Stephen John Unger, Newfoundland, NJ (US); Nitin Gogate, Montvale, NJ (US)

(72) Inventors: Michael Green, Central Valley, NY (US); Stephen John Unger, Newfoundland, NJ (US); Nitin Gogate, Montvale, NJ (US)

(73) Assignee: Fujitsu Limited, Kawasaki (JP)

( * ) Notice: Subject to any disclaimer, the term of this patent is extended or adjusted under 35 U.S.C. 154(b) by 90 days.

(21) Appl. No.: 14/510,664

(22) Filed: Oct. 9, 2014

(65) Prior Publication Data
US 2016/0105284 A1    Apr. 14, 2016

(51) Int. Cl.
*H04L 29/06* (2006.01)
*H04L 9/32* (2006.01)
*G06F 7/04* (2006.01)
*G06F 17/30* (2006.01)
*H04N 7/16* (2011.01)

(52) U.S. Cl.
CPC .......... *H04L 9/3228* (2013.01); *H04L 63/08* (2013.01); *H04L 63/12* (2013.01); *H04L 63/162* (2013.01)

(58) Field of Classification Search
CPC ...... H04L 63/14; H04L 63/1408; G06F 21/50
USPC ............. 713/168–169; 370/216–252; 726/3
See application file for complete search history.

(56) References Cited

U.S. PATENT DOCUMENTS

| | | | | |
|---|---|---|---|---|
| 5,412,654 A | * | 5/1995 | Perkins | H04L 45/02 370/312 |
| 6,014,380 A | * | 1/2000 | Hendel | H04L 29/06 370/392 |
| 6,081,522 A | * | 6/2000 | Hendel | H04L 45/742 370/389 |
| 7,240,202 B1 | * | 7/2007 | Orman | H04L 9/0833 380/255 |

(Continued)

OTHER PUBLICATIONS

IEEE 802.1, "IEEE Standards for Local and metropolitan area networks: Media Access Control (MAC) Security", *IEEE Computer Society*, 154 pages, 2006.

(Continued)

*Primary Examiner* — Shin-Hon Chen
(74) *Attorney, Agent, or Firm* — Baker Botts L.L.P.

(57) ABSTRACT

Methods and systems are provided for detection of unauthorized entities in communication systems. The method includes obtaining a secret string by a first network element and generating a random number by the first network element. The method also includes computing a first cryptographic result by the first network element. The first cryptographic result is based on a cryptographic function, the secret string, and the random number. The method further includes attempting to transmit, by the first network element, a first packet that includes the random number to a second network element using a layer 2 packet terminating protocol. The method includes receiving, within a configured time, a second packet including a second cryptographic result at the first network element, and terminating transmission to the second network element when a second cryptographic result is different from the first cryptographic result.

13 Claims, 5 Drawing Sheets

(56) References Cited

U.S. PATENT DOCUMENTS

| | | | | |
|---|---|---|---|---|
| 7,447,147 B2* | 11/2008 | Nguyen | | G06F 1/206 |
| | | | | 370/216 |
| 7,843,848 B2* | 11/2010 | Shvodian | | H04J 3/0682 |
| | | | | 370/241 |
| 8,281,134 B2* | 10/2012 | Bajic | | H04L 9/0844 |
| | | | | 380/270 |
| 8,397,064 B2* | 3/2013 | Khermosh | | H04L 63/162 |
| | | | | 380/256 |
| 8,490,159 B2* | 7/2013 | Costa | | H04Q 11/0067 |
| | | | | 726/3 |
| 8,806,011 B1* | 8/2014 | Graham-Cumming | | H04L 63/1458 |
| | | | | 709/225 |
| 8,886,934 B2* | 11/2014 | Eckert | | H04L 63/0869 |
| | | | | 713/168 |
| 2004/0179521 A1* | 9/2004 | Kim | | H04L 63/08 |
| | | | | 370/384 |
| 2006/0028996 A1* | 2/2006 | Huegen | | H04L 63/126 |
| | | | | 370/252 |
| 2009/0049532 A1* | 2/2009 | Gao | | H04L 63/08 |
| | | | | 726/5 |
| 2010/0228964 A1* | 9/2010 | Booth | | H04L 63/16 |
| | | | | 713/151 |
| 2012/0093508 A1* | 4/2012 | Baykal | | H04L 12/2881 |
| | | | | 398/58 |
| 2012/0144187 A1* | 6/2012 | Wei | | H04L 63/0281 |
| | | | | 713/152 |
| 2012/0151554 A1* | 6/2012 | Tie | | H04L 63/20 |
| | | | | 726/1 |
| 2014/0115341 A1* | 4/2014 | Robertson | | H04L 9/3228 |
| | | | | 713/183 |

OTHER PUBLICATIONS

IEEE 802.3, "IEEE Standard for Ethernet", *IEEE Computer Society*, 634 pages, 2012.

\* cited by examiner

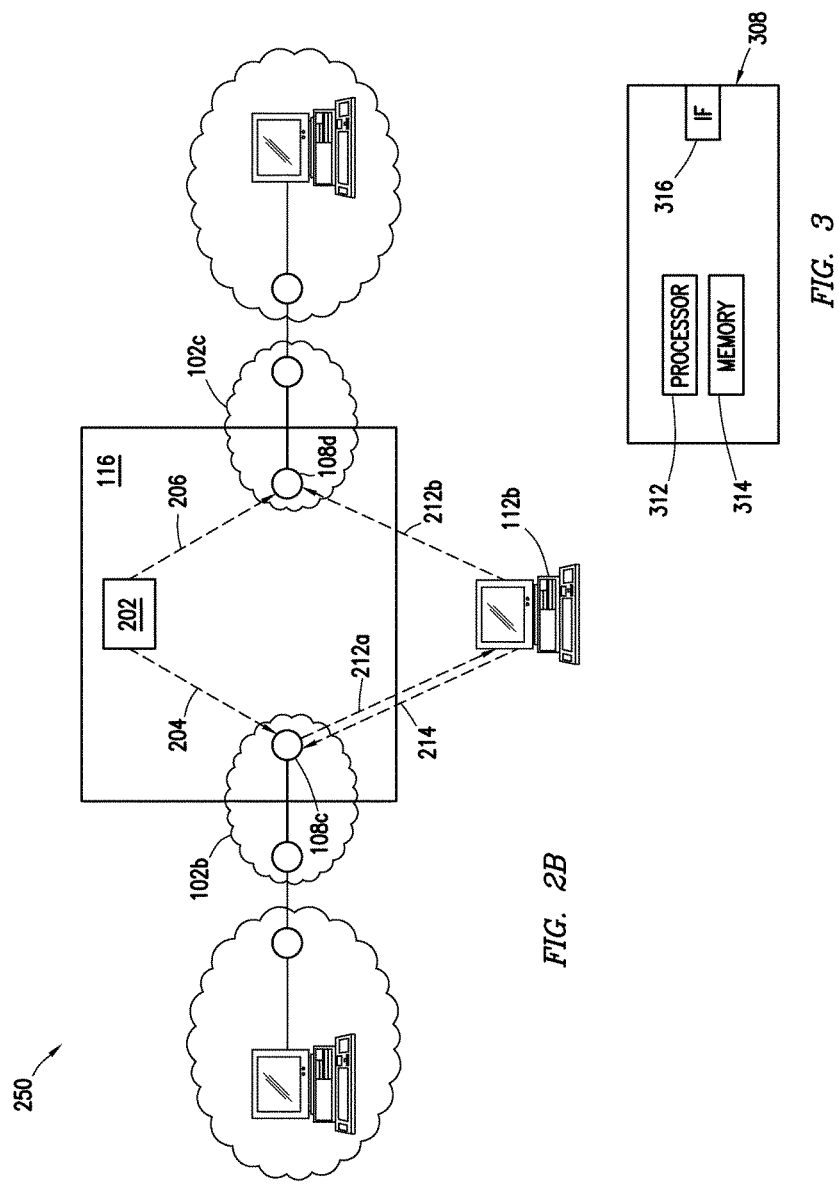

DETECTION OF UNAUTHORIZED ENTITIES IN COMMUNICATION SYSTEMS

TECHNICAL FIELD

The present disclosure relates generally to communication networks and, more particularly, to the detection of unauthorized entities in communication systems.

BACKGROUND

A communication system includes network elements that route packets through the communication system. Multiple networks are connected to allow the routing of packets from one endpoint to another endpoint. Networks may be connected with other networks via inter-network links that may constitute portions of a network interface. Unauthorized or malicious entities may insert themselves into the inter-network links and network interfaces to intercept or disrupt traffic, and thereby, compromise the security of information traveling between networks. Because of the constraints and methodology used by typical security solutions, such solutions may be unable to detect or identify the insertion of an unauthorized entity into the network interface.

SUMMARY

In particular embodiments, a method for detection of an unauthorized entity in a layer 2 communication system is provided. The method includes obtaining a secret string by a first network element and generating a random number by the first network element. The method also includes computing a first cryptographic result by the first network element. The first cryptographic result is based on a cryptographic function, the secret string, and the random number. The method further includes attempting to transmit, by the first network element, a first packet that includes the random number to a second network element using a layer 2 packet terminating protocol. The method includes receiving, within a configured time, a second packet including a second cryptographic result at the first network element, and terminating transmission to the second network element when a second cryptographic result is different from the first cryptographic result.

In another embodiment, a network element is provided. The network element includes a memory and a processor communicatively coupled to the memory. The processor is configured to obtain a secret string, generate a random number, and compute a first cryptographic result. The first cryptographic result is based on a cryptographic function, the secret string, and the random number. The processor is further configured to attempt to transmit, in a first packet that includes the random number to a second network element using a layer 2 packet terminating protocol, and receive, within a configured time, a second packet including a second cryptographic result. The processor is also configured to terminate transmission to the second network element when a second cryptographic result is different from the first cryptographic result.

In another embodiment, a network interface is provided that includes a first network element and a second network element communicatively coupled to the first network element. The first network element is configured to obtain a secret string, generate a random number, and compute a first cryptographic result. The first cryptographic result is based on a cryptographic function, the secret string, and the random number. The first network element is further configured to attempt to transmit, in a first packet that includes the random number to a second network element using a layer 2 packet terminating protocol, and receive, within a configured time, a second packet including a second cryptographic result. The first network element is also configured to terminate transmission to the second network element when a second cryptographic result is different from the first cryptographic result.

BRIEF DESCRIPTION OF THE DRAWINGS

For a more complete understanding of the present disclosure and its features and advantages, reference is now made to the following description, taken in conjunction with the accompanying drawings, in which:

FIGS. 2A and 2B illustrate an example embodiment of a layer 2 communication system in accordance with one embodiment of the present disclosure;

FIG. 3 is a block diagram illustrating an example embodiment of the internal components of a network element and/or a network management system in accordance with one embodiment of the present disclosure.

DETAILED DESCRIPTION

Embodiments of the present disclosure and its advantages are best understood by referring to FIGS. 1A-4 of the drawings, like numerals being used for like and corresponding parts of the various drawings.

Figure 1A:
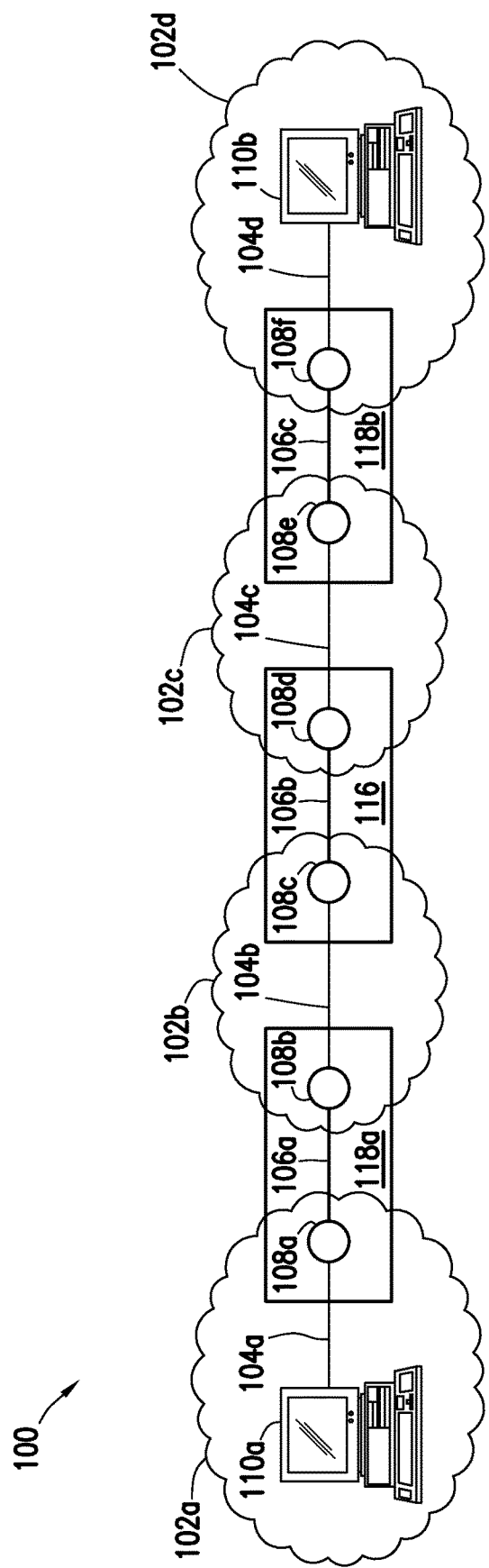
FIGS. 1A and 1B illustrate example embodiments of a communication system comprising various communication networks in accordance with one embodiment of the present disclosure.
Figure 1B:
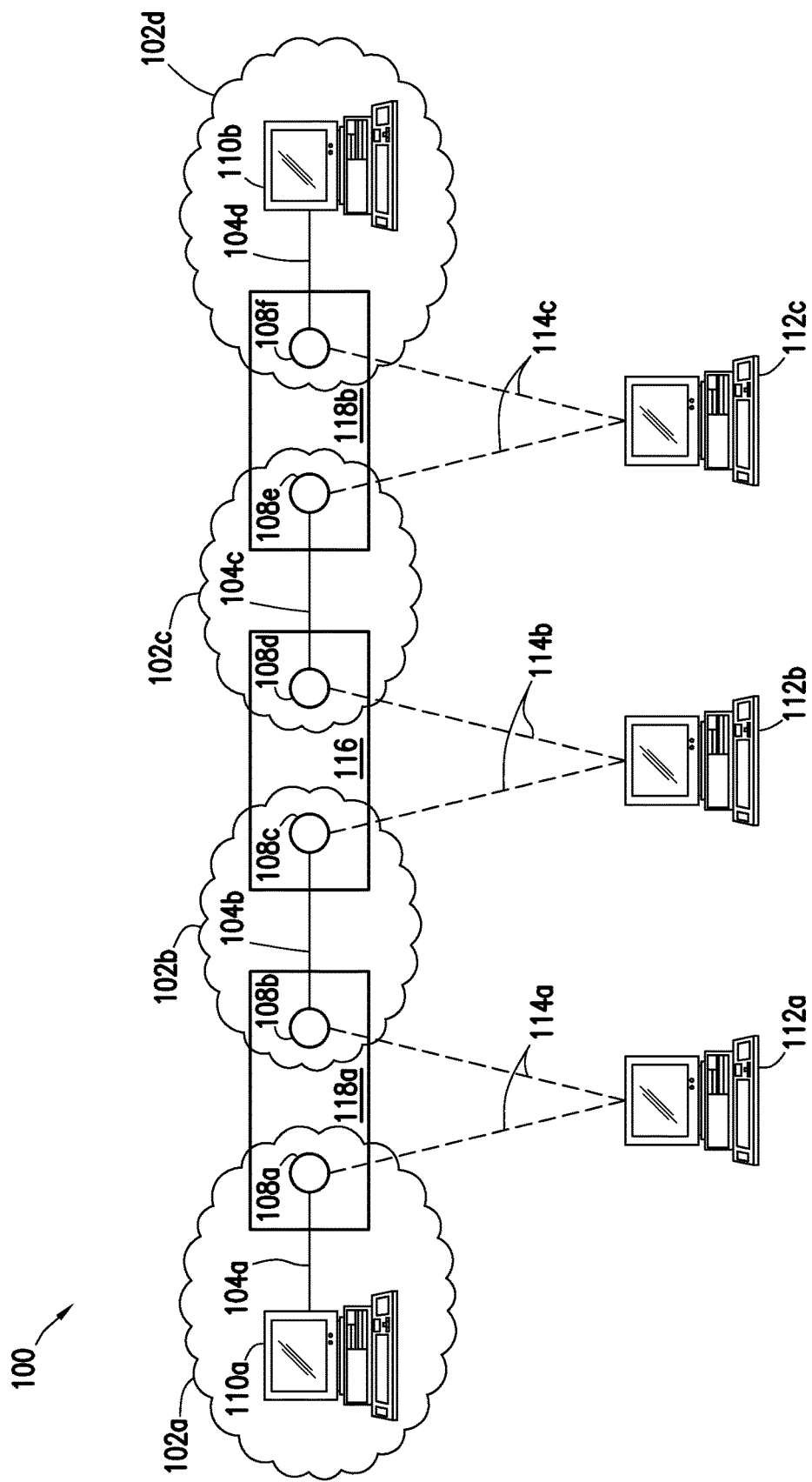

FIGS. 1A and 1B illustrate example embodiments of communication system 100 comprising various communication networks in accordance with one embodiment of the present disclosure. FIG. 1A illustrates communication system 100 operating with direct links between various communication networks. Communication system 100 may be comprised of multiple networks 102a-102d (collectively "networks 102"). Each network 102 may be any of a variety of communication networks designed to facilitate one or more different services either independently or in conjunction with other networks. For example, networks 102 may facilitate internet access, peer-to-peer file sharing (P2P), file sharing, or any other type of functionality typically provided by a network. Networks 102 may provide their respective services using any of a variety of protocols for either wired or wireless communication.

Networks 102 may be connected to each other and with other networks via a plurality of intra-network links 104a-104d (collectively "intra-network links 104"), inter-network links 106a-106c (collectively "inter-network links 106"), and network elements 108a-108f (collectively "network elements 108"). Not only do the intra-network links 104, inter-network links 106, and network elements 108 connect various networks but they also interconnect endpoints 110a-110b (collectively "endpoints 110") with one another and with any other components coupled to or a part of any of networks 102. The interconnection of networks 102 may enable endpoints 110 to communicate data and control signaling between each other as well as allowing any intermediary components or devices to communicate data and control signals. Accordingly, users of endpoints 110 may be able to send and receive data and control signals between and among each network component coupled to one or more of networks 102. Generally, networks 102 provide for the communication of packets, cells, frames, or other portions of information between endpoints 110 and/or network elements 108.

Each intra-network link 104 or inter-network link 106 may include any system, device, or apparatus configured to communicatively couple network elements 108 and/or endpoints 110. For example, intra-network links 104 and inter-network links 106 may include an optical fiber, an ethernet cable, a T1 cable, a WiFi signal, a Bluetooth signal, or any other suitable medium.

Communication system 100 may communicate information or "traffic" over intra-network links 104 and inter-network links 106. As used herein "traffic" means information transmitted, stored, or sorted in communication system 100. Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and Internet Protocol (IP). Additionally, the traffic communicated in communication system 100 may be structured in any appropriate manner including, but not limited to, being structured in frames, packets, or an unstructured bit stream.

Although communication system 100 includes four different networks 102 the term "network" should be interpreted as generally defining any network or combination of networks capable of transmitting signals, data, and/or messages, including signals, data or messages transmitted through WebPages, e-mail, text chat, voice over internet protocol (VoIP) calls, video over IP calls, online gaming, instant messaging or any other suitable type of functionality. Depending on the scope, size and/or configuration of the network, any one of networks 102 may be implemented as a local area network (LAN), wide area network (WAN), metropolitan area network (MAN), public switched telephone network (PSTN), worldwide interoperability for microwave access (WiMAX) network, global distributed network such as the Internet, Internet, Extranet, or any other form of wireless or wired networking. Further, although FIG. 1A illustrates a particular number and configuration of intra-network links 104, inter-network links 106, network elements 108, and endpoints 110 for simplicity, communication system 100 and networks 102 contemplate any number or arrangement of such components for communicating data in accordance with some embodiments of the present disclosure. In addition, elements of communication system 100 may include components centrally located (local) with respect to one another or distributed throughout communication system 100.

Network elements 108 may allow for the exchange of packets, cells, frames, or other portions of information (generally referred to as packets herein) in communication system 100. Network elements 108 (also referred to as "nodes") may comprise any suitable system operable to transmit and receive traffic. In the illustrated embodiment, each network element 108 may be operable to transmit traffic directly to one or more other network elements 108 and receive traffic directly from the one or more other network elements 108. Network elements 108 may include one or more network components, session border controllers, gatekeepers, base stations, conference bridges, routers, hubs, switches, gateways, endpoints, network interface devices (NIDs), line cards, packet optical networking platforms (packet ONP), content delivery systems (CDS), or any other hardware, software, or embedded logic implementing any number of communication protocols. For example, network elements 108a, 108d, and 108f may each be or include a CDS. As another example, network elements 108b and 108e may each be or include a packet ONP. Network elements 108 may include drivers for passing packets from one network element 108 to another network element 108. For example, drivers at network elements 108c and 108d may include IEEE Standard 802.3 media access control (MAC) drivers. IEEE Standard 802.3 is a collection of standards defining the physical layer and data link layer's MAC of connections made between network elements 108, other nodes, and/or other infrastructure devices via wired Ethernet.

Endpoints 110 and/or network elements 108 may provide data or network services to a user through any combination of hardware, software embedded in a computer readable medium, and/or encoded logic incorporated in hardware or otherwise stored (e.g., firmware). For example, endpoints 110a and 110b may include an IP telephone, a computer, a video monitor, a camera, a personal data assistant, a cell phone or any other hardware, software and/or encoded logic that supports the communication of packets (or frames) using networks 102. Endpoints 110 may also include unattended or automated systems, gateways, other intermediate components or other devices that can send or receive data and/or signals.

In some embodiments, networks 102a and 102d may be customer networks and networks 102b and 102c may be operator networks. Customer networks 102a and 102d may include endpoints 110 or may be separate from and connect to endpoints 110. Networks 102 may be trusted or core networks that are associated with a network management system. A network management system may be a separate system or may be a component of a network element in networks 102.

Networks 102 may be connected to each other and with other networks via inter-network links 106 and network elements 108. In some embodiments, inter-network links 106 may communicatively couple multiple networks. A particular inter-network link 106 and the network elements coupled by inter-network link 106 may be referred to as a network interface. For example, inter-network link 106b may communicatively couple operator networks 102b and 102c via network elements 108c and 108c, respectively. Inter-network link 106b and network elements 108c and 108d may be described as an external network-network interface (ENNI) 116. Inter-network link 106a may communicatively couple customer network 102a with operator network 102b via network elements 108a and 108b, respectively. Inter-network link 106c may communicatively couple operator network 102c with customer network 102d, via network elements 108e and 108f, respectively. Inter-network link 106a, customer network 102a with operator network 102b may collectively be referred to as user network interface (UNI) 118a. Inter-network link 106c, customer network 102d with operator network 102c may collectively be referred to as UNI 118b. ENNI 116 and UNIs 118a and 118b may be referred to as network interfaces.

FIG. 1B illustrates communication system 100 with unauthorized entities 112a-112c between various communication networks. In some embodiments, inter-network links 106 may be susceptible to intrusion by unauthorized entities 112a-112c (collectively "unauthorized entities 112"). Unauthorized entities 112 may be capable of attacking communication system 100 by inserting equipment via unauthorized links 114a-114c (collectively "unauthorized links 114") that supplant inter-network links 106 shown in FIG. 1A. However, some security solutions and protocols may not detect or identify the presence of unauthorized entities 112. For example, some security solutions may be based on MAC address lists, IP access lists, or higher layer protocols. Yet, unauthorized entities 112 may be able to access MAC address and IP access lists or exploit other flaws in security solutions and thus, be undetectable. Security solutions based on MAC address, IP address, or higher level protocols may not take into account or be able to detect or identify an unauthorized entity inserted into an ENNI or a UNI.

In particular embodiments, networks 102 may be internet protocol (IP) networks. IP networks transmit data by placing the data in packets and sending each packet individually to the selected destination, along one or more communication paths. Because IP networks share a common method of transmitting data, signals may be transmitted between devices located on different, but interconnected, IP networks. Further, point-to-point protocol (PPP) is a layer 3 protocol that may be utilized by network elements to establish connections between two network elements. PPP encapsulates and transports IP traffic over point-to-point links. As such, PPP may be utilized for the assignment and management of IP addresses. PPP may utilize an authentication protocol to authenticate a user or network element to a separate network element. For example, a PPP network element may utilize challenge-handshake authentication protocol (CHAP) for authentication. CHAP uses an incrementally changing identifier and a variable challenge-value to provide protection for a PPP connection. With CHAP, both network elements in a particular transmission know a secret string. CHAP periodically verifies the identity of a network element by using a three-way handshake that occurs when the initial link or transmission is established and possibly again anytime later. The verification is based on a shared secret string.

However, because PPP is a layer 3 protocol, unauthorized entities 112 that use an Ethernet (layer 2) switch on inter-network link 106 may not be detected. Thus, in some embodiments, using a layer 2 single-hop protocol employing CHAP for authentication may discover unauthorized entities 112 that would otherwise be undetected.

Movement of a packet from one network element to another, or from a source to a destination, may be termed a "hop." The hop count refers to the intermediate devices (such as IP routers and Ethernet switches) through which a packet must pass between source and destination, rather than flowing directly over a single wire. Each time a packet is passed from one device to another, a hop occurs as the packet is moved from one network layer (layer 1) to another. Traffic may include management plane traffic (layer 2) and service traffic (higher layers). Management plane traffic may be primarily single-hop and service plane traffic (also referred to as "data traffic") may be primarily multi-hop. As such, service plane traffic does not necessarily terminate at a particular network element or after a single hop. However, in some embodiments, by detecting an unauthorized entity that is using an Ethernet switch or IP router, service plane traffic that is multi-hop may be terminated using a layer 2 protocol.

In some embodiments, communication system 100 may apply a layer 2 packet terminating protocol to the transmission of a packet. Certain Ethernet protocols may drop or terminate packets and may not forward packets onto the next network element and/or other equipment. For example, communication system 100 may apply a single-hop protocol (based on IEEE Standard 802.3) to the transmission of a packet such that the packet is transmitted a single-hop and then terminates. Use of a single-hop protocol may allow detection of or identification of unauthorized entities 112. A single-hop protocol frame or packet may be terminated when received by an IEEE 802.3 compliant network element (e.g., Ethernet switch) and may not be forwarded. Thus, a single-hop protocol packet may travel a single hop and terminate. For example, an Ethernet protocol based on a layer 2 protocol, such as Link Operation, Administration, and Maintenance (OAM) (as defined IEEE Standard 802.3ah/IEEE Standard 802.3 (2005) Clause 57), may be considered a single-hop protocol based on termination when received by a network element. Other protocols may be utilized that are single-hop or layer 2 packet terminating protocols including, for example, link aggregation group (LAG), link aggregation control protocol (LACP), light-weight directory access protocol (LDAP), and/or any other suitable protocols. Extending a pre-existing protocol that is already executing to include a layer 2 packet terminating protocol (e.g., a single-hop protocol), may allow communication system 100 to detect the presence of and/or identify unauthorized entities 112. After detection of unauthorized entities 112, the transmission may be terminated to limit or eliminate unauthorized entities 112 access to transmissions, Terminating transmission based on detection of unauthorized entity 112 terminates traffic that is multi-hop—service plane traffic—since management plane traffic may already be single hop. As such, in some embodiments, layer 3 traffic may terminate and any layer 2 traffic that is multi-hop may also terminate.

In some embodiments, an extension may be added to packets utilizing a layer 2 packet terminating protocol. For example, an extension may be encoded as a type-length-value (TLV) element, or signature, inside a packet or frame. A TLV signature may be proprietary (or vendor specific) and may only be recognized by network elements 108 that are authorized and/or are a component of networks 102. In some embodiments, communication system 100 may employ CHAP for authentication by using vendor specific TLVs.

In some embodiments and as discussed in detail below, by using CHAP in a Link OAM or other layer 2 packet terminating protocol (e.g., other Ethernet packet terminating data link layer protocol), if unauthorized entity 112 attempts to access inter-network links 106, packets that are intercepted by unauthorized entity 112 may not be recognized by network elements 108. When unauthorized entity 112 is detected or identified, network element 108 may indicate the presence of the unauthorized entity and/or activate or log a security alarm or drop the unauthorized frames, thereby keeping the unauthorized communication from traveling further within communication system 100. Thus, in some embodiments, utilizing a layer 2 packet terminating protocol with a proprietary TLV signature may allow for detection of and mitigation of access by unauthorized entities 112. Details regarding the implementation of a proprietary TLV signature is discussed below.

Figure 2A:
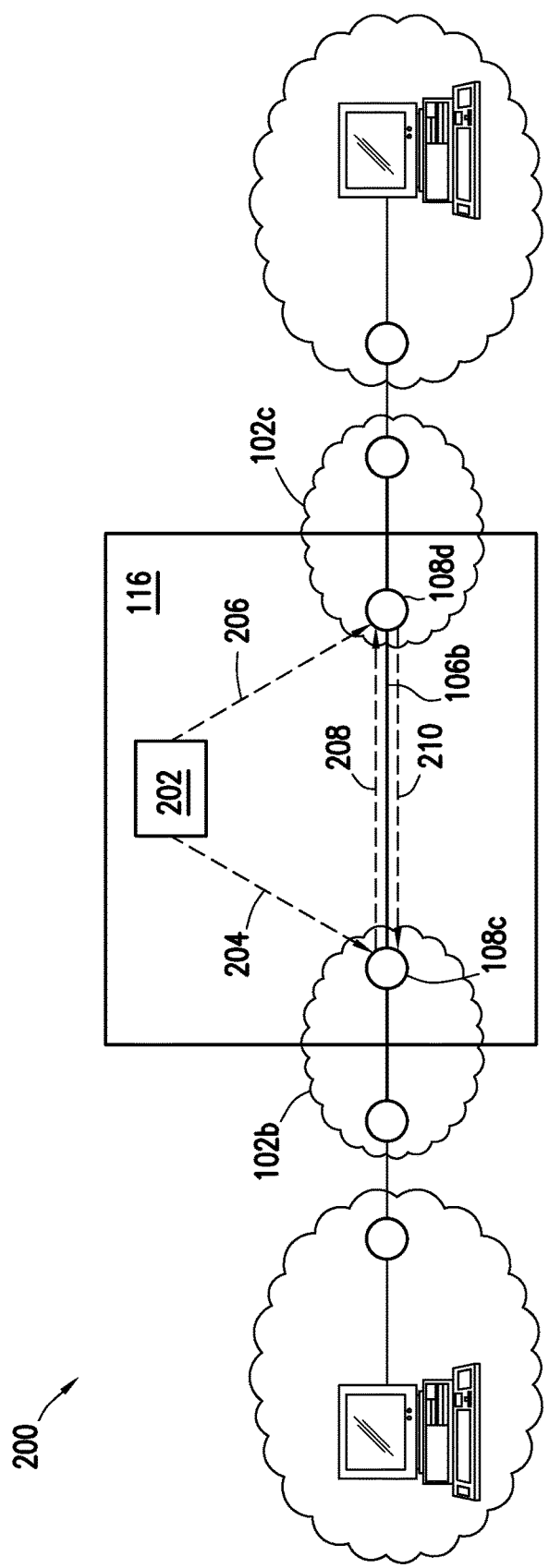

FIGS. 2A and 2B illustrate example embodiments of layer 2 communication system 200 in accordance with one embodiment of the present disclosure. System 200 may include network management system 202. In some embodiments, network management system 202 may be any computing system or processor that is communicatively coupled to two or more networks 102, such as operator networks 102b and 102c. In some embodiments, network management system 202 may be a component of a network element, such as network elements 108c and 108d, or network management system 202 may be a separate computing system. In the example shown in FIG. 2A, network management system 202 is a separate computing system connected to network elements 108c and 108d via trusted transmissions 204 and 206, respectively. Network management system 202 may be a component of a network interface, such as an ENNI or UNI. For example, network management system 202 may be a component of ENNI 116.

In some embodiments, network management system 202 may generate a secret string to be used for communication across ENNI 116. The secret string may be communicated by network management system 202 to some or all network elements in operator networks included in ENNI 116. For example, network element 108c in operator network 102b and network element 108d in operator network 102c may both receive the secret string from network management system 202 via trusted transmissions 204 and 206, respectively. The secret string may be a shared secret that is firewalled or otherwise protected by network elements that receive the secret string. Network elements that receive the secret string may be termed authorized or trusted network elements. In some embodiments, network elements may generate random numbers to use in communications. Both network elements on the ends of a single hop may run CHAP protocol for authorization with different random numbers but the same secret string. Each communication between network elements may include a different random number.

In operation, packets may be transmitted within ENNI 116. For example, network element 108c may attempt to transmit a packet to network element 108d shown by transmission 208, which may be associated with inter-network link 106b. The packet may utilize a layer 2 packet terminating protocol (e.g., a single-hop protocol) and may include an encrypted TLV extension or signature based on a cryptographic function (for example, an encryption algorithm, an algorithm mode, a cryptographic hash, or a sign function). A cryptographic result may be calculated that employs the secret string obtained from network management system 202 and a random number that is generated by the transmitting network element (e.g., network element 108c). For example, network element 108c may compute and store a cryptographic result that is a hash value using SHA-1 Hashing, the random number (RN_A), and concatenated secret string (SS), HASH_A=SHA1(RN_A+SS). The transmitting network element (e.g., network element 108c) may send RN_A in a proprietary protocol packet, for example a Link OAM packet (LOAM[RN_A]), to a receiving network element in the receiving network (e.g., network element 108d as shown by transmission 208). Although the current example discusses the Link OAM protocol, any suitable layer 2 single-hop protocol may be utilized. In some embodiments, the receiving network element may receive the packet, LOAM[RN_A], and compute a cryptographic result using the same cryptographic function as the sending network element. For example, network element 108d may compute the cryptographic result, HASH_B=SHA1(RN_A+SS). Network element 108d may transmit a return Link OAM packet including the cryptographic result, LOAM [HASH_B], to network element 108c shown by transmission 210 via inter-network link 106b. Network element 108c may extract HASH_B from received LOAM[HASH_B] and compare the stored HASH_A to the received HASH_B. If HASH_A and HASH_B match, network element 108c may continue to transmit packets to network element 108d. If HASH_A and HASH_B do not match, network element 108c may activate (or trigger) alarms, such as light emitting diodes (LEDs), Transaction Language 1 (TL1) alarms, Simple Network Management Protocol (SNMP) traps, drop all received packets or frames, and/or execute any other suitable action.

Accordingly, a transmitted packet may utilize a layer 2 packet terminating protocol that may include a TLV extension based on the secret string and a random number. During regular transmission, an unauthorized entity may attempt to intercept a transmission from a network element. For example, FIG. 2B illustrates layer 2 communication system 200 with unauthorized entity 112b. Unauthorized entity 112b may attempt to intercept a transmission from network element 108c to network element 108d, shown by intercept transmission 212a and 212b that supplant transmissions 208 and 210, and inter-network link 106b shown in FIG. 2A. Unauthorized entity 112b may be a component or equipment that is unable to process a packet that utilizes a layer 2 packet terminating protocol (e.g., a layer 2 single-hop protocol packet). For example, some components or equipment (such as some inexpensive Ethernet switches and IP routers) with standard IEEE 802.3 MAC drivers may be unable to process layer 2 single-hop protocol packets. Thus, when unauthorized entity 112b attempts to intercept a layer 2 single-hop protocol packet, unauthorized entity 112b cannot process the layer 2 single-hop protocol packet and network element 108c fails to receive the expected response within the configured time. Network element 108c may indicate the presence of unauthorized entity 112b, and may activate (or trigger) alarms (such as light emitting diodes (LEDs), Transaction Language 1 (TL1) alarms, Simple Network Management Protocol (SNMP) traps), drop all received packets or frames, and/or execute any other suitable action.

In some embodiments, unauthorized entity 112b may be a component or equipment that is capable of processing packets utilizing a layer 2 packet terminating protocol (e.g., a layer 2 single-hop protocol packet). In this case, unauthorized entity 112b may transmit or respond back to network element 108c shown by transmission 214. However, because unauthorized entity 112b is not provided with the secret string, unauthorized entity 112b may be unable to generate the correct encoded TLV extension for the layer 2 single-hop protocol packet. For example, when network element 108c compares the stored HASH (e.g., HASH_A) with the received HASH (e.g., HASH_B), network element 108c may determine that there is no match. Network element 108c may indicate the presence of unauthorized entity 112b, and may activate (or trigger) alarms (such as light emitting diodes (LEDs), Transaction Language 1 (TL1) alarms, Simple Network Management Protocol (SNMP) traps), drop all received packets or frames, and/or execute any other suitable action.

Modifications, additions or omissions may be made to communication system 200 without departing from the scope of the disclosure. For example, communication system 200 may include more or fewer elements than those depicted. Additionally communication system 200 may include additional elements not expressly shown, such as a wireless network.

FIG. 3 is a block diagram illustrating an example embodiment of the internal components of a network element 108 and/or network management system 202 (referred to generally as "element 308") in accordance with one embodiment of the present disclosure. Element 308 may represent a portion of the internal components of network element 108 and/or network management system 202. For simplicity, element 308 has been depicted in isolation, though in use element 308 may be connected to multiple other network elements, such as any of the network elements depicted in FIGS. 1 and 2. Depending on the embodiment, element 308 may comprise more or fewer internal components, and one or more of the components may be external to network element 308. Element 308 may include processor 312, memory 314, and interface 316 and/or any other suitable components.

In some embodiments, processor 312 may be a microprocessor, controller, or any other suitable computing device, resource, or combination of hardware, software and/or encoded logic operable to provide, either alone or in conjunction with other element 308 components, such as memory 314, element 308 functionality. Such functionality may include providing various features discussed herein to an endpoint or network, such as endpoints 110 or networks 102 discussed with reference to FIGS. 1 and 2. For example, processor 312 may be configured to generate random numbers, encrypt and/or decrypt packets or frames, obtain and store one or more secret strings, generate a secret string to share with other components of networks 102, generate and maintain configuration parameters associated with hardware and software components of element 308, and/or any other suitable functions. In some embodiments, processor 312 may be configured to execute multiple cryptographic functions (e.g., encryption algorithms, algorithm modes, cryptographic hashes, and/or cryptographic sign functions), and/ or load random numbers and secret strings for encryption or decryption tasks. A particular cryptographic function may be specified as a function of a task to be performed or a protocol to be utilized by processor 312. Accordingly, processor 312 may have stored thereon a plurality of cryptographic functions that may be executed. Further, processor 312 may be configured to load or otherwise utilize one or more secret strings. Such secret strings may be firewalled or otherwise configured such that the secret strings remain secure. Processor 312 may be configured to authenticate a transmission prior to acceptance or forwarding of a transmission. Authentication may be based on a secret string, a random number, a particular cryptographic function, and/or any other suitable authentication parameter.

Memory 314 may be any form of volatile or non-volatile memory including, without limitation, magnetic media, optical media, random access memory (RAM), read-only memory (ROM), flash memory, removable media, or any other suitable local or remote memory component or components. Memory 314 may store any suitable data or information utilized by a network element and/or network management system, including software embedded in a computer readable medium, and/or encoded logic incorporated in hardware or otherwise stored (e.g., firmware). In some embodiments, memory 314 may store information used by processor 312. Memory 314 may also store the results and/or intermediate results of the various calculations and determinations performed by processor 312. Memory 314 may also maintain a list, database, or other organization of data useful for determining how to route data to the proper endpoints and/or relay stations.

Interface 316 may be used in the communication of signaling and/or data with other network elements or nodes. For example, via interface 316, element 308 may receive a message including a secret string and/or a random number. The number and type of interfaces 316 included with element 308 may be based on the number and type of networks to which element 308 is coupled. For example, element 308 may be coupled to an operator network and a customer network. Further, interface 316 may perform any formatting or translating that may be needed to allow element 308 to send and receive data over a connection. Interface 316 may also be used to establish any wired connections between element 308 and other networks or network components.

Figure 4:
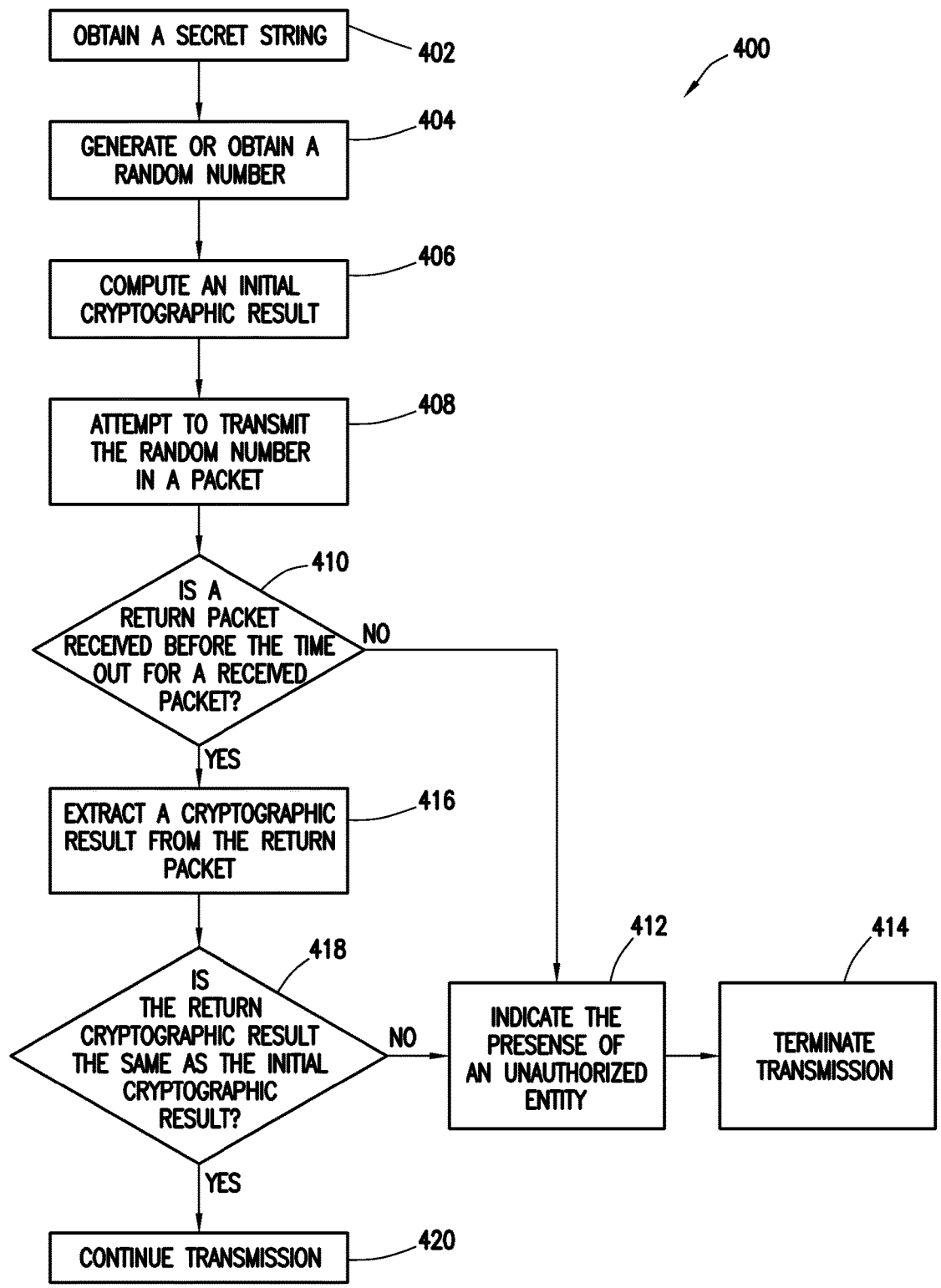
FIG. 4 illustrates a method for detection of an unauthorized entity in a layer 2 communication system in accordance with one embodiment of the present disclosure.

FIG. 4 illustrates a method for detection of an unauthorized entity in a layer 2 communication system in accordance with one embodiment of the present disclosure. Method 400 may be implemented fully or in part by a network element of FIG. 2B. The steps of method 400 may be performed by hardware, software, firmware or any combination thereof. The software or firmware may include instructions stored on non-transitory computer-readable medium, and operable to perform, when executed, one or more of the steps described below. The computer-readable media may include any system, apparatus or device configured to store and retrieve programs or instructions such as a hard disk drive, a compact disc, flash memory or any other suitable device. The software or firmware may be configured to direct a processor or other suitable unit to retrieve and execute the instructions from the computer-readable media. For illustrative purposes, method 400 is described with respect to communication system 200 and network element 108$c$ of FIG. 2B; however, method 400 may be used for detection of unauthorized entities on any suitable communication system. In addition, although FIG. 4 discloses a certain order of steps to be taken with respect to method 400, the steps comprising method 400 may be completed in any suitable order.

In step 402, the network element obtains a secret string. The secret string may be communicated by a network management system to some or all network elements in multiple networks, such as operator networks included in an ENNI. For example, network element 108$c$ in operator network 102$b$ and network element 108$d$ in operator network 102$c$ may both receive the secret string from network management system 202 via trusted transmissions 204 and 206, respectively, as discussed with reference to FIG. 2A. The secret string may be a shared secret that is firewalled or otherwise protected by network elements that receive the secret string. Further, network elements that receive the secret string may be termed authorized or trusted network elements. Thus, only authorized network elements may know the secret string. For example, as discussed with reference to FIG. 2, network management system 202 may communicate the secret string to network element 108$c$. The secret string may be a shared secret that is firewalled or otherwise protected by network elements that receive the secret string.

In step 404, the network element generates a random number. For example, network element 108$c$ may generate a random number to be used in communications with other network elements. A network management system may direct a network element to generate the random number.

In step 406, the network element computes an initial cryptographic result. The cryptographic result may employ the secret string obtained from network management system 202 and the random number that is generated by the transmitting network element (e.g., network element 108$c$). The cryptographic result may be based on a particular cryptographic function. For example, network element 108$c$ may compute and store a cryptographic result that is a hash value using SHA-1 Hashing, the random number (RN_A), and concatenated secret string (SS), HASH_A=SHA1(RN_A+ SS). The network element may store the initial cryptographic result, HASH_A.

In step 408, the network element attempts to transmit the random number in a packet to a receiving network element in a separate network. The transmission may utilize a layer 2 packet terminating protocol, such as a layer 2 single-hop protocol. For example, the transmitting network element (e.g., network element 108c) may send RN_A in a proprietary protocol packet, such as a Link OAM packet (LOAM [RN_A]) to a receiving network element in the receiving network (e.g., network element 108d).

In step 410, the network element determines if a return packet is received before the time out for a received packet. If an unauthorized entity intercepts the transmission, the unauthorized entity may be a component or equipment that is unable to process a packet that utilizes a layer 2 packet terminating protocol (e.g., a layer 2 single-hop protocol packet). For example, some components or equipment (such as some inexpensive Ethernet switches and IP routers) with standard IEEE 802.3 MAC drivers may be unable to process layer 2 single-hop protocol packets. Thus, when unauthorized entity 112b that is unable to process layer 2 single-hop protocol packets attempts to intercept a packet, the transmitting network element (network element 108c) will fail to receive the expected response within the configured time. If the network element does not receive the return packet within the configured time (e.g., time out for received packet), then method 400 proceeds to step 412.

At step 412, the network element indicates the presence of the unauthorized entity. For example, network element 108c may indicate the presence of unauthorized entity 112b, and may activate (or trigger) alarms (such as light emitting diodes (LEDs), Transaction Language 1 (TL1) alarms, Simple Network Management Protocol (SNMP) traps), drop all received packets or frames, and/or execute any other suitable action. At step 414, the network element may terminate transmission.

If at step 410 the network element receives the return packet, method 400 proceeds to step 416. At step 416, the network element extracts a cryptographic result from the return packet. The receiving network element may receive the packet from the transmitting network element, LOAM [RN_A], and compute a cryptographic result using the same cryptographic function as the sending network element. For example, network element 108d may compute the cryptographic result, HASH_B=SHA1(RN_A+SS). Network element 108d may transmit a return Link OAM packet including the cryptographic result, LOAM[HASH_B], to network element 108c. When the return packet is received, network element 108c may extract HASH_B from received LOAM [HASH_B].

At step 418, the network element may determine if the return cryptographic result is the same as the initial cryptographic result. For example, network element 108c may compare the stored HASH_A to the received HASH_B. If HASH_A and HASH_B match, method 400 may proceed to step 420 and continue transmission. For example, network element 108c may continue to transmit packets to network element 108d. If HASH_A and HASH_B do not match, method 400 may proceed to step 412.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for detection of an unauthorized entity in a layer 2 communication system, comprising:
   obtaining a secret string by a first network element;
   generating a random number by the first network element;
   computing a first cryptographic result by the first network element, the first cryptographic result based on a cryptographic function, the secret string, and the random number;
   transmitting, by the first network element, a first packet that includes the random number to a second network element using an IEEE Standard 802.3 layer 2 single-hop packet terminating protocol, wherein the layer 2 single-hop packet terminating protocol is a link Operations, Administration, and Maintenance (OAM) protocol;
   receiving a second packet including a second cryptographic result at the first network element;
   terminating transmission to the second network element when a second cryptographic result is different from the first cryptographic result;
   terminating transmission to the second network element when the second packet is not received in a configured time; and
   indicating, by the first network element, the presence of an unauthorized entity when the second cryptographic result is different from the first cryptographic result or when the second packet is not received in a configured time.

2. The method of claim 1, further comprising:
   continuing transmission to the second network element when the second cryptographic result is the same as the first cryptographic result.

3. The method of claim 1, wherein indicating includes activating an alarm.

4. The method of claim 3, wherein the alarm is one of a light emitting diode (LED), Transaction Language 1 (TL1) alarm, or a Simple Network Management Protocol (SNMP) trap.

5. The method of claim 1, wherein the second packet is transmitted using a layer 2 packet terminating protocol.

6. The method of claim 1, wherein attempting to transmit by the first network element is by means of an inter-network link.

7. The method of claim 1, where the cryptographic function is one of an encryption algorithms, an algorithm mode, a cryptographic hashes, a cryptographic sign function.

8. A network element comprising:
   a memory; and
   a processor communicatively coupled to the memory, the processor configured to:
      obtain a secret string;
      generate a random number;
      compute a first cryptographic result, the first cryptographic result based on a cryptographic function, the secret string, and the random number;
      transmit, in a first packet that includes the random number to a second network element using an IEEE Standard 802.3 layer 2 single-hop packet terminating protocol, wherein the layer 2 single-hop packet terminating protocol is a link Operations, Administration, and Maintenance (OAM) protocol;
      receive a second packet including a second cryptographic result at the first network element;
      terminate transmission to the second network element when a second cryptographic result is different from the first cryptographic result;
      terminate transmission to the second network element when the second packet is not received in a configured time; and indicate, by the first network element, the presence of an unauthorized entity when the second cryptographic result is different from the first cryptographic result or when the second packet is not received in a configured time.

9. The network element of claim 8, the processor further configured to:
continue transmission to the second network element when the second cryptographic result is the same as the first cryptographic result.

10. The network element of claim 8, wherein indicating includes activating an alarm.

11. The network element of claim 10, wherein the alarm is one of a light emitting diode (LED), Transaction Language 1 (TL1) alarm, or a Simple Network Management Protocol (SNMP) trap.

12. A network interface comprising:
a first network element including a processor and a memory; and
a second network element communicatively coupled to the first network element, the processor and the memory of the first network element configured to execute functionality to:
obtain a secret string;
generate a random number;
compute a first cryptographic result, the first cryptographic result based on a cryptographic function, the secret string, and the random number;
transmit a first packet that includes the random number to a second network element using an IEEE Standard 802.3 layer 2 single-hop packet terminating protocol, wherein the layer 2 single-hop packet terminating protocol is a link Operations, Administration, and Maintenance (OAM) protocol;
receive a second packet including a second cryptographic result;
terminate transmission to the second network element when a second cryptographic result is different from the first cryptographic result;
terminate transmission to the second network element when the second packet is not received in a configured time; and
indicate, by the first network element, the presence of an unauthorized entity when the second cryptographic result is different from the first cryptographic result or when the second packet is not received in a configured time.

13. The network interface of claim 12, the processor and the memory of the first network element further configured to execute functionality to:
continue transmission to the second network element when the second cryptographic result is the same as the first cryptographic result.

* * * * *